United States Patent
Taniguchi et al.

(10) Patent No.: US 8,351,714 B2
(45) Date of Patent: Jan. 8, 2013

(54) IMAGE PROCESSING APPARATUS AND COMPUTER READABLE MEDIUM STORING PROGRAM THEREFOR

(75) Inventors: Tomoki Taniguchi, Ashigarakami-gun (JP); Taro Yokose, Ashigarakami-gun (JP)

(73) Assignee: Fuji Xerox Co., Ltd., Tokyo (JP)

(*) Notice: Subject to any disclaimer, the term of this patent is extended or adjusted under 35 U.S.C. 154(b) by 1032 days.

(21) Appl. No.: 12/076,624

(22) Filed: Mar. 20, 2008

(65) Prior Publication Data
US 2008/0298681 A1 Dec. 4, 2008

(30) Foreign Application Priority Data
May 30, 2007 (JP) ................................ 2007-143116

(51) Int. Cl.
*G06K 9/36* (2006.01)

(52) U.S. Cl. ......... 382/232; 382/173; 345/555; 708/203

(58) Field of Classification Search .................. 382/173, 382/232; 345/555; 708/203
See application file for complete search history.

(56) References Cited

U.S. PATENT DOCUMENTS

| | | | | | |
|---|---|---|---|---|---|
| 5,911,008 | A | * | 6/1999 | Niikura et al. | 382/236 |
| 5,995,080 | A | * | 11/1999 | Biro et al. | 345/603 |
| 6,005,980 | A | * | 12/1999 | Eifrig et al. | 382/236 |
| 6,014,181 | A | * | 1/2000 | Sun | 348/699 |

FOREIGN PATENT DOCUMENTS

| | | |
|---|---|---|
| JP | A 09-074475 | 3/1997 |
| JP | A-11-027664 | 1/1999 |
| JP | A-2005-223538 | 8/2005 |

OTHER PUBLICATIONS

Notification of Reasons for Refusal in corresponding Japanese Patent Application No. 2007-143116 on Aug. 2, 2011. (with English language translation).

* cited by examiner

*Primary Examiner* — Chan S Park
*Assistant Examiner* — Eueng-Nan Yeh
(74) *Attorney, Agent, or Firm* — Oliff & Berridge, PLC

(57) ABSTRACT

An image processing apparatus includes: a reference-based coding unit that encodes image information for an image partition having a predefined size by referring to image information for another image partition; an independently coding unit that encodes the image information for the image partition independently of any other image partition; and a bounds defining unit that defines bounds of reference to be made by the reference-based coding unit.

7 Claims, 10 Drawing Sheets

IMAGE CODING PROGRAM 4

IMAGE EDITING PROGRAM 5

INPUT IMAGE

CODE DATA

BEFORE INTERCHANGING CODES

INTERCHANGE CODES

AFTER INTERCHANGING CODES

FIG. 6A
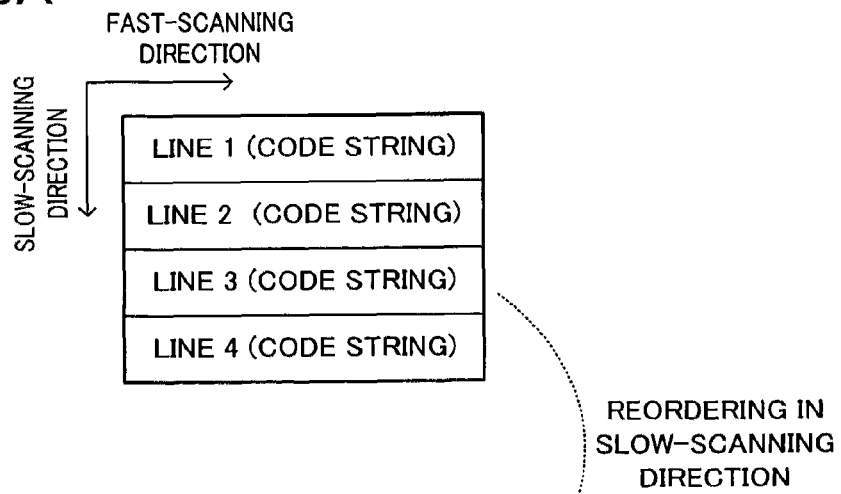
FIG. 6B
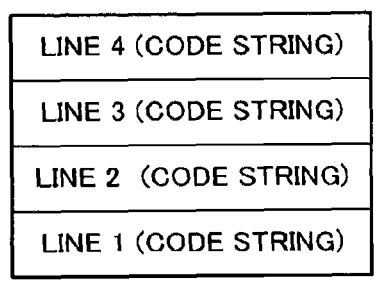
FIG. 6C
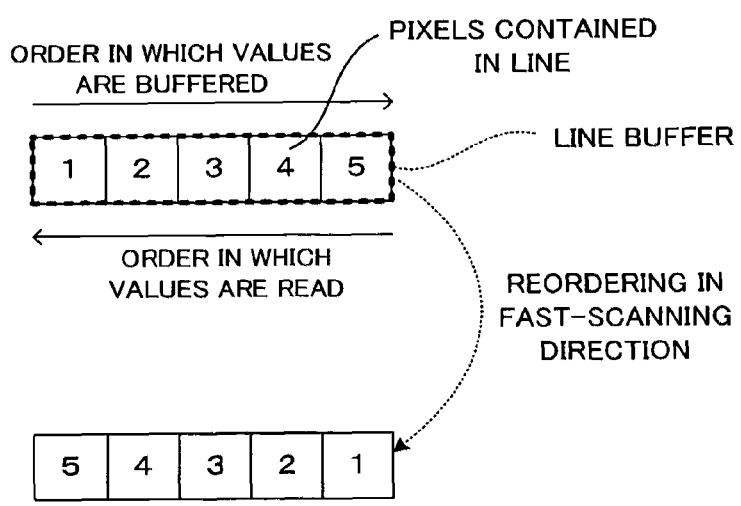
FIG. 6D

IMAGE PROCESSING APPARATUS AND COMPUTER READABLE MEDIUM STORING PROGRAM THEREFOR

CROSS-REFERENCE TO RELATED APPLICATIONS

This application is based on and claims priority under 35 USC 119 from Japanese Patent Application No. 2007-143116 filed May 30, 2007.

BACKGROUND

Technical Field

The present invention relates to an image processing apparatus and a computer readable medium storing a program therefor.

SUMMARY

According to an aspect of the invention, an image processing apparatus includes a reference-based coding unit that encodes image information for an image partition having a predefined size by referring to image information for another image partition; an independently coding unit that encodes the image information for the image partition independently of any other image partition; and a bounds defining unit that defines bounds of reference to be made by the reference-based coding unit.

BRIEF DESCRIPTION OF THE DRAWINGS

An exemplary embodiment of the present invention will be described in detail based on the following figures, wherein:

FIGS. 6A to 6D illustrate processing for image rotation by 180 degrees for lines, wherein one fast-scan line is regarded as an image subset;

DETAILED DESCRIPTION

An overview of an image forming system is described for an exemplary embodiment of the present invention.

Figure 1:
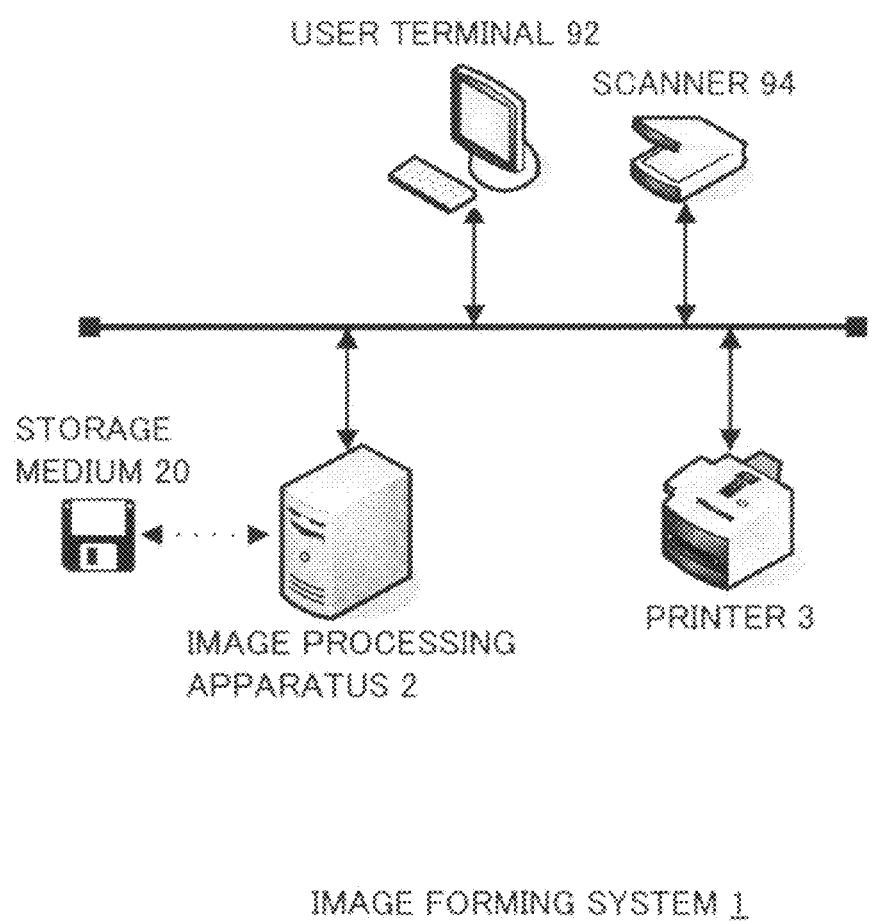
FIG. 1 illustrates an overview of an image forming system.

FIG. 1 illustrates an overview of the image forming system.

As illustrated in FIG. 1, the image forming system 1 includes an image processing apparatus 2 and a printer 3.

The image processing apparatus 2 is a computer. The image processing apparatus 2 in this example is connected to a network such as LAN. The image processing apparatus 2 performs image processing on image information received from a user terminal 92 or a scanner 94 and sends the processed image information to the printer 3. An example of image processing discussed in this exemplary embodiment is rotating an image input to the processing apparatus (input image) by 180 degrees.

The printer 3 is an example of an image forming apparatus. The printer 3 in this example receives image information from the image processing apparatus 2 via the network such as LAN and prints an image on printing paper based on the received image information.

Alternatively, the image processing apparatus 2 may be provided within the housing of the printer 3.

Figure 2A:
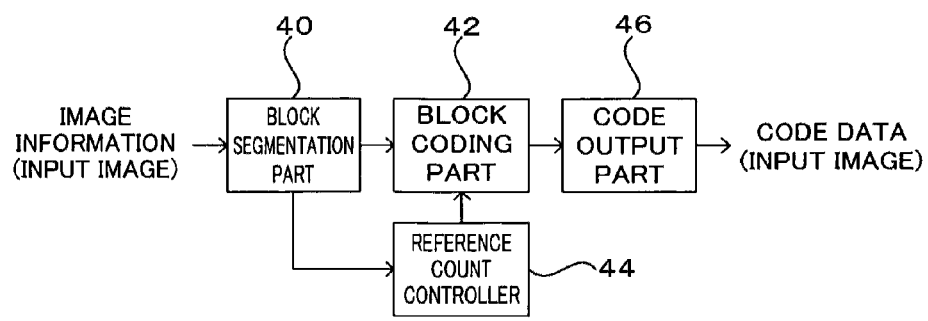
FIG. 2A illustrates an arrangement of functions of an image coding program 4 (embodied in a computer readable medium) which is executed by the image processing apparatus 2 (FIG. 1)
Figure 2B:
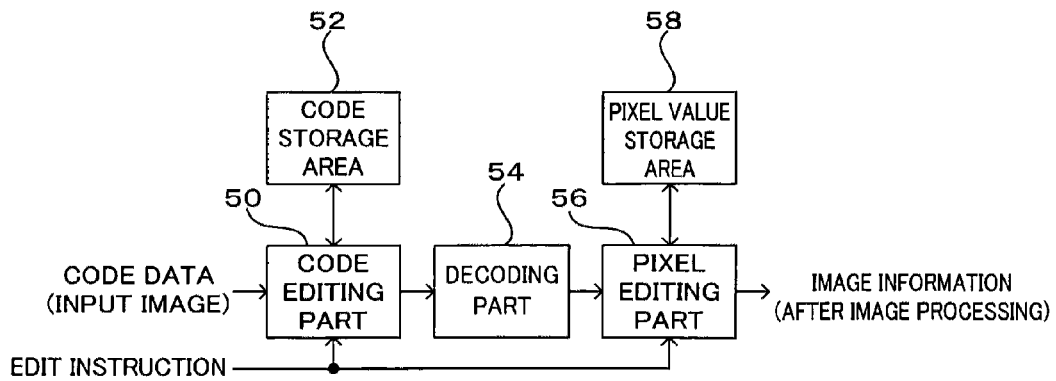
FIG. 2B illustrates an arrangement of functions of an image editing program 5 (embodied in a computer readable medium)

FIG. 2A illustrates an arrangement of functions of an image coding program 4 (embodied in a computer readable medium) which is executed by the image processing apparatus 2 (FIG. 1). FIG. 2B illustrates an arrangement of functions of an image editing program 5 (embodied in a computer readable medium).

As illustrated in FIG. 2A, the image coding program 4 includes a block segmentation part 40, a block coding part 42, a reference count controller 44, and a code output part 46.

As illustrated in FIG. 2B, the image editing program 5 includes a code editing part 50, a code storage area 52, a decoding part 54, a pixel editing part 56, and a pixel value storage area 58.

Some or all of the functions of the image coding program 4 and the image editing program 5 are, for example, recorded on a storage medium 20 (FIG. 1) and installed into the image processing apparatus 2 from the storage medium 20. Alternatively, the functions of the image editing program 5 may be installed into the image processing apparatus 2 via the network.

In the image coding program 4, the block segmentation part 40 segments an image of input image information into image partitions (blocks), each partition (block) containing plural pixels.

For example, the block segmentation part 40 segments an input image into rectangular image blocks, each made up of N×M pixels.

The block coding part 42 encodes the values of pixels contained in an image partition to be coded (target block) by referring to another image partition (block) within the bounds of reference defined by the reference count controller 44. More specifically, if reference to another block is permitted by the reference count controller 44, the block coding part 42 compares the values of the pixels contained in the target block with the values of the pixels contained in an image partition (reference block) in a pre-specified position with respect to the target block. When there is a predetermined relation between the respective values of the pixels of both blocks, the block coding part 42 generates a code including information to identify this reference block (information for the block referred to) (coding by a reference-based coding unit). When there is not such a predetermined relation therebetween, the block coding part 42 encodes the values of the pixels contained in the target block independently within the block (coding by an independently coding unit). If reference to another block is inhibited by the reference count controller 44, the block coding part 42 simply encodes the values of the pixels within the target block.

Figure 3A:
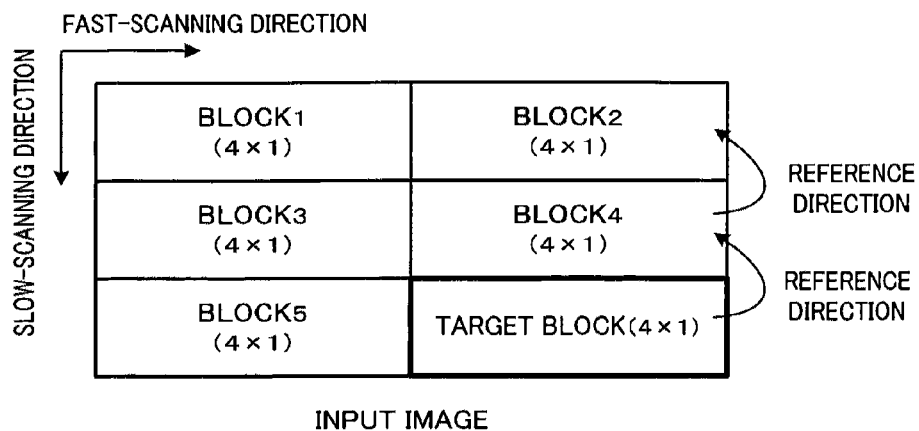
FIGS. 3A and 3B illustrate processing of coding by the image coding program 4.
Figure 3B:
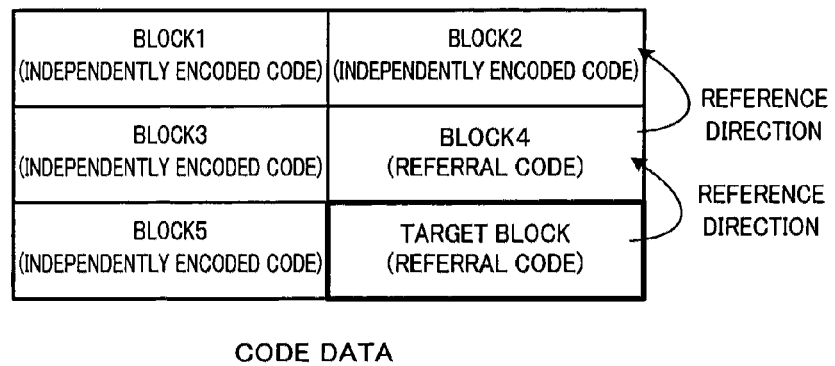

The block coding part 42 in this example, if the reference count controller 44 permits reference in the slow-scanning direction, compares the values of plural pixels contained in the target block with values of plural pixels contained in a block (one upper block) existing upstream of the target block in the slow-scanning direction, as illustrated in FIG. 3A. If the respective values of all pixels of both blocks match with each other (that is, there is a complete match between the target block and the one upper block), the block coding part 42 generates a code indicating referral to the one upper block (a referral code as illustrated in FIG. 3B). When a mismatch occurs, the block coding part 42 converts the values of the pixels within the target block into a code independently encoded in the block (independently encoded code as illustrated in FIG. 3B). If the reference count controller 44 inhibits reference in the slow-scanning direction, the block coding part 42 in this example converts the values of the pixels within the target block into a code independently encoded in the block (independently encoded code as illustrated in FIG. 3B).

The reference count controller 44 defines the bounds of reference to be made by the block coding part 42. Here, the bounds of reference are the bounds within which an image segment (block) is directly or indirectly referred to. If a segment (block) referred to further makes reference to another image segment, the bounds of reference cover this other image segment. For example, as illustrated in FIG. 3A, when the target block makes reference to block 4 and block 4 makes reference to block 2, block 2 falls within the bounds of reference of the target block.

The reference count controller 44 in this example counts the number of times the target block has referred to another block directly or indirectly (reference count). It permits or inhibits reference for encoding the target block, so that the reference count will be less than an upper limit value C.

The code output part 46 outputs image information encoded by the block coding part 42 to the image editing program 5.

In the image editing program 5, the code editing part 50 manipulates the encoded image information in units of image partitions (blocks). Because the values of plural pixels exist in an image partition, the code editing part 50 manipulates code strings included in code data, wherein each code string corresponds to the values of plural pixels in a block. In the description of the present exemplary embodiment, a set of codes corresponding to the values of all pixels contained in an image partition is termed a code string and a set of codes corresponding to a whole image is termed code data.

The code editing part 50 in this example, when instructed to edit the image, buffers the code strings of blocks into the code storage area 52, as appropriate for edit processing specifics given in the instruction, and performs manipulation such as reordering the code strings buffered, deleting any string(s), or adding a string(s), utilizing the code storage area 52.

The code editing part 50 also interchanges the code strings, as appropriate for the manipulation such as reordering the code strings stored, deleting any string(s), or adding a string(s).

The code storage area 52 is a data buffer for storing code strings that are manipulated by the code editing part 50. Size of the code storage area 52 is large enough to store code strings within the bounds of reference permitted by the reference count controller 44.

The code storage area 52 in this example has a storage space whose size is determined by C (upper limit of reference count)×N (integer).

The decoding part 54 decodes the code data input from the code editing part 50 and outputs decoded image data to the pixel editing part 56. Since the code strings have been interchanged appropriately in the code data manipulated (such as reordering, deletion, etc.) by the code editing part 50, they can be decoded even if the order of the code strings has been changed.

The pixel editing part 56 buffers the image data decoded by the decoding part 54 into the pixel value storage area 58 and manipulates the pixels in the image data buffered, utilizing the pixel value storage area 58.

The pixel editing part 56 in this example reorders the values of the pixels decoded, deletes any pixel value(s), or adds a pixel value(s), as appropriate for the edit processing specifics (such as an angle of rotation, shift amount, and direction).

The pixel value storage area 58 is a data buffer for storing the values of the pixels that are manipulated by the pixel editing part 56.

The pixel value storage area 58 in this example has a storage space whose size is determined by 2×N (pixels on one fast-scan line).

FIGS. 4A to 4E illustrate processing for rotating the image by 180 degrees by the image editing program 5.

Figure 5A:
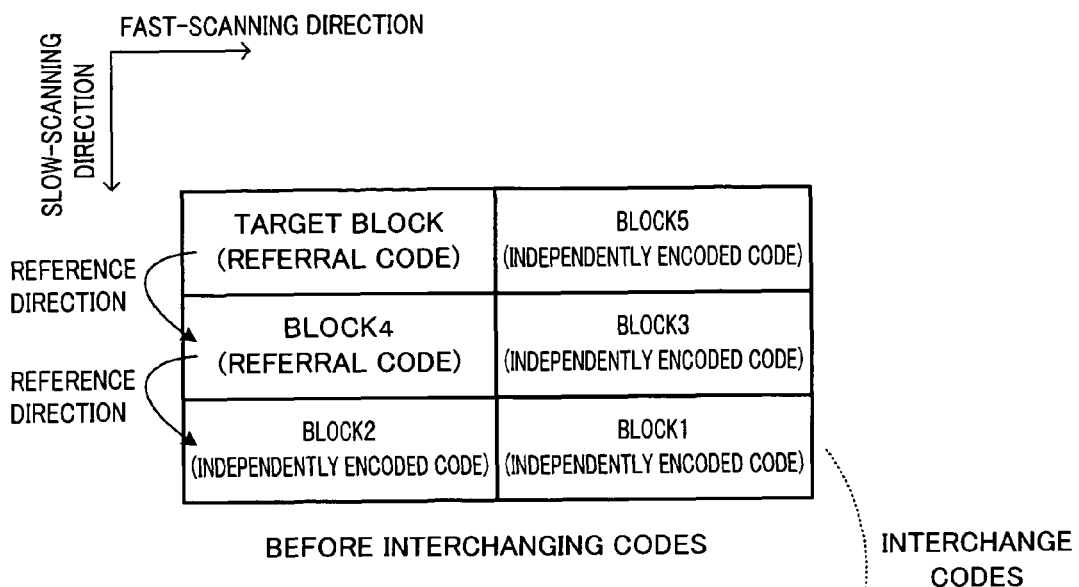
FIGS. 5A and 5B illustrate interchanging code strings.
Figure 5B:
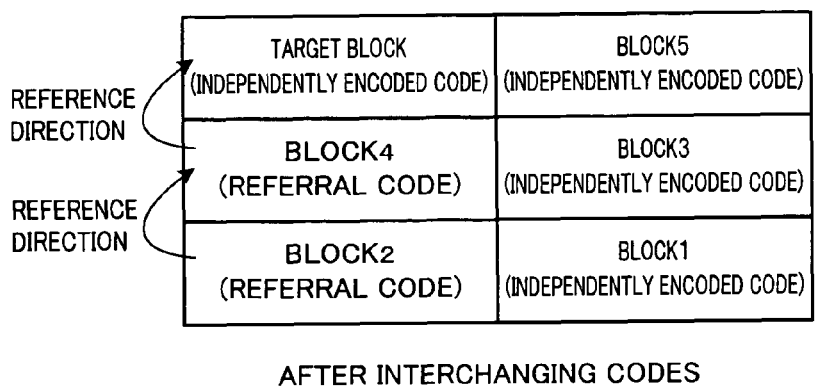

FIGS. 5A and 5B illustrate interchanging of code strings.

Figure 4A:
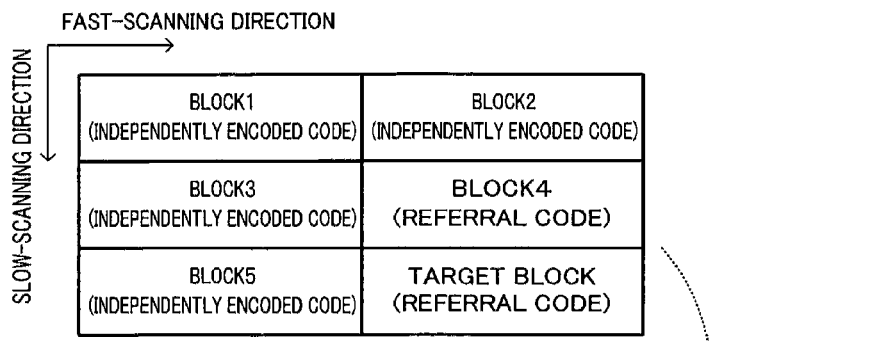
FIGS. 4A to 4D illustrate processing for image rotation by 180 degrees.
Figure 4B:
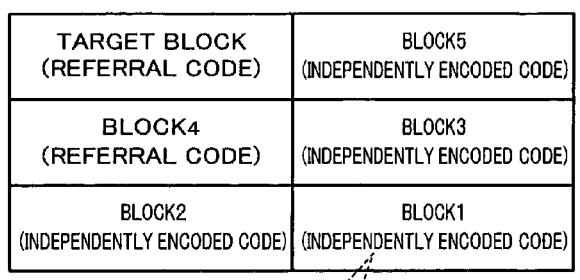
Figure 4B:
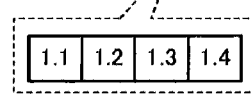

When instructed to rotate the image by 180 degree as an edit operation, the code editing part 50 (FIG. 2) buffers code data as illustrated in FIG. 4A (code strings of blocks 1 to 5 and the target block) into the code storage area 52. By reading the buffered code strings in order from the lowest position in the fast-scanning direction and the slow-scanning direction, the code editing part 50 accomplishes rotating the image by 180 degrees at the block level, as illustrated in FIG. 4B.

Figure 4C:
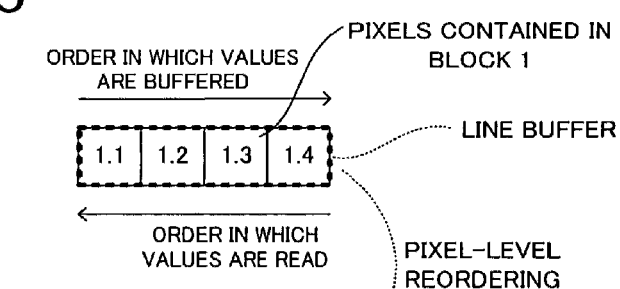

Then, the decoding part 54 decodes the code strings which have been input sequentially from the code editing part 50 and outputs a set of decoded values of pixels to the pixel editing part 56. FIG. 4C illustrates a set of pixels for one image partition, output from the decoding part 54. For illustrative purposes, the processing is explained assuming that one image partition contains four pixels in this example. However, the number of pixels that may be contained in an image partition is not limited to four.

Figure 4D:
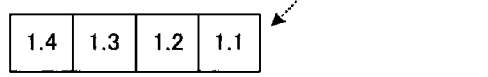

The pixel editing part 56 reorders the values of pixels input from the decoding part 54 pixel by pixel in the fast-scanning direction. More specifically, the pixel editing part 56 buffers the values of pixels as many as contained in one image partition (four pixels in this example) input from the decoding part 54 into the pixel value storage area 58 (line buffer) and reads these values from the line buffer in reverse order to the order in which the values have been buffered, as illustrated in FIG. 4C. Thereby, mirroring of the values of the pixels for one image partition in the fast-scanning direction is accomplished, as illustrated in FIG. 4D.

As described above, processing for image rotation by 180 degrees is carried out by combination of rotation by 180 degrees at the level of image partitions (processing on codes) and rotation by 180 degrees at the level of pixels (processing on the values of pixels).

The code strings in FIG. 4B cannot be decoded according to scan order without being manipulated. This is because, for example, the code string (referral code) of block 4 makes reference to block 2 that appears later in scan order.

Thus, the code editing part 50 in this example interchanges the code strings, as illustrated in FIGS. 5A and 5B. That is, when a referral code to another block is included in code strings to be processed (code strings to be manipulated) for rotating the image by 180 degrees at the block level (processing in FIG. 4A→FIG. 4B), the code editing part 50 interchanges the referral code to this other block and the code of the block referred to. In FIG. 5A, for example, the code (referral code) of block 4 refers to the code (independently encoded code) of block 2. Therefore, the code editing part 50 interchanges these codes, so that the block 4 has the independently encoded code and the block 2 has the referral code to block 4. Furthermore, because the code (referral code) of the target block refers to the code (independently encoded code) of the block 4, the code editing part 50 interchanges these codes, so that the target block has the independently encoded code and the block 4 has the referral code to the target block.

[Modification 1]

An example of modification to the above-described exemplary embodiment is then described.

FIGS. 6A to 6D illustrate line by line processing for rotating the image by 180 degrees.

As illustrated in FIG. 6A, processing for rotating the image by 180 degrees may be performed in the same manner as described in the above-described exemplary embodiment by assuming one line in the fast-scanning direction as one image partition (block). In this case as well, code strings for each line are reordered in the slow-scanning direction, as illustrated in FIG. 6B. At this time, if any line refers to another line, interchanging between the code (referral code) that refers to another line and the code (independently encoded code) of the line referred to is performed.

Then, as illustrated in FIGS. 6C and 6D, mirroring of the values of pixels contained in each line in the fast-scanning direction is performed, utilizing a buffer for one-line data (pixel value storage area 58).

In the present modification, one fast-scan line is assumed as one block and every whole line is encoded. Alternatively, the code strings of blocks illustrated in FIG. 4A may be assembled per line and mirroring in the slow-scanning direction may be performed for the code strings for one line (for example, the code strings of block 1 and block 2 in FIG. 4A). In other words, each of the lines "line 1" to "line 4" illustrated in FIG. 6 may be configured to include code strings of plural blocks existing on the line.

[Modification 2]

Figure 7A:
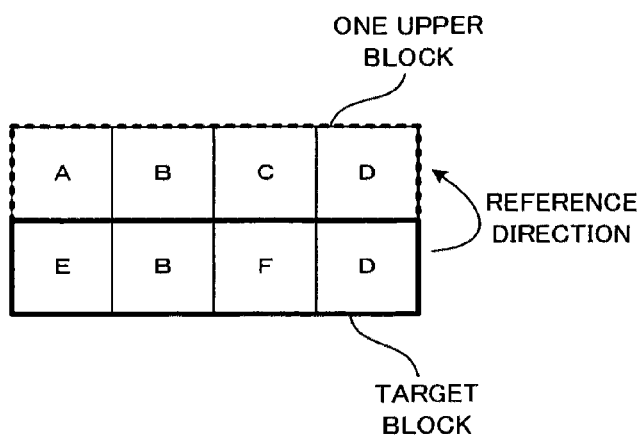
FIGS. 7A to 7C illustrate a referral code containing information relevant to differences.
Figure 7B:
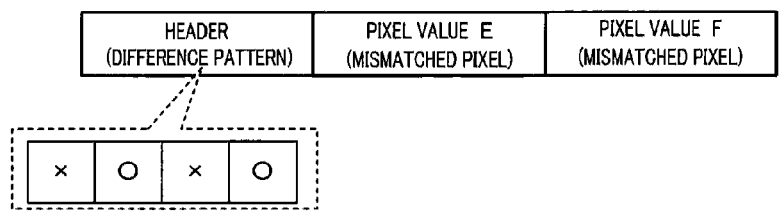
Figure 7C:

FIGS. 7A to 7C illustrate a referral code in a second modification.

In the above-described exemplary embodiment, only if there is a complete match between a block that refers to another block and the block referred to, block coding with a referral code is applied; however, this is not restrictive.

In the second modification, after comparing the target block and the reference block, if differences therebetween meet a predetermined condition, information to identify the block referred to and information to specify the differences are encoded in a referral code.

Given that, for example, as illustrated in FIG. 7A, the first pixel (with a pixel value E) and the third pixel (with a pixel value F) of the target block do not match with the corresponding pixels (with a pixel value A and a pixel value C) of the reference block and the second and fourth pixels of the target block match with the corresponding pixels (with a pixel value B and a pixel value D) of the reference block, this conforms with a difference pattern ("mismatch", "match", "mismatch", "match") which is illustrated in FIG. 7B and, hence, the target block is encoded with a referral code as illustrated in FIG. 7B. The referral pattern in FIG. 7B includes a header to specify the difference pattern (a pattern of positions where a difference other than 0 exists) and mismatched pixel values (the pixel value E and the pixel value F in this example).

The referral code may be composed of a header indicating the number of mismatched pixels, pixel positions indicating the positions of mismatched pixels, and mismatched pixel values, as illustrated in FIG. 7C. While mismatched pixel values are encoded in the above modification 2, the differences (prediction errors) of the corresponding pixel values may be encoded.

[Modification 3]

Figure 8A:
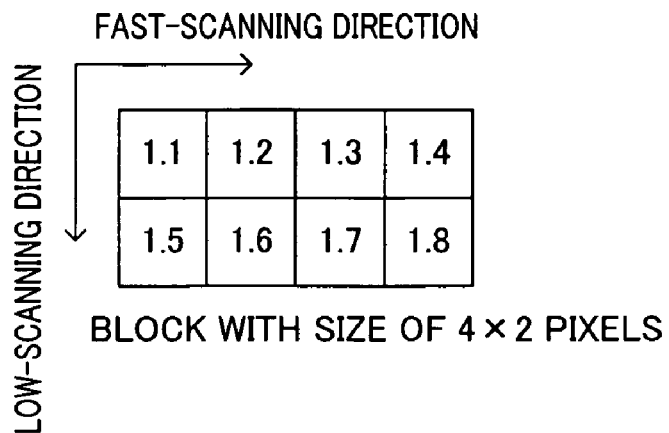
FIGS. 8A to 8C illustrate processing for image rotation by 180 degrees in a case where an image partition is defined as having 4×2 pixels.
Figure 8B:
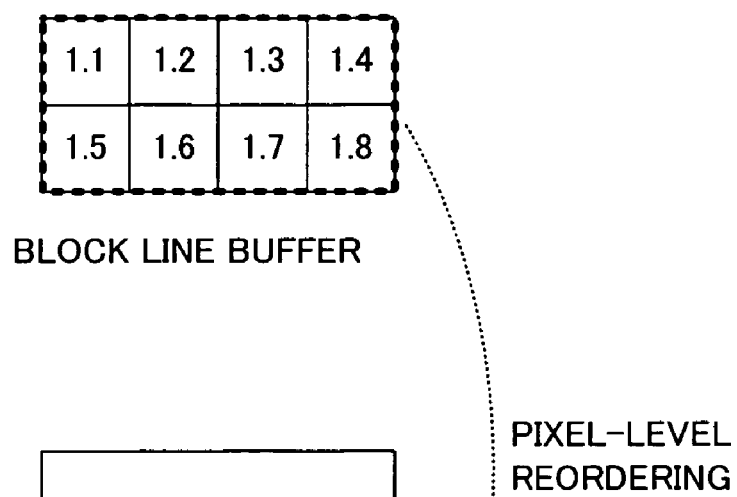
Figure 8C:
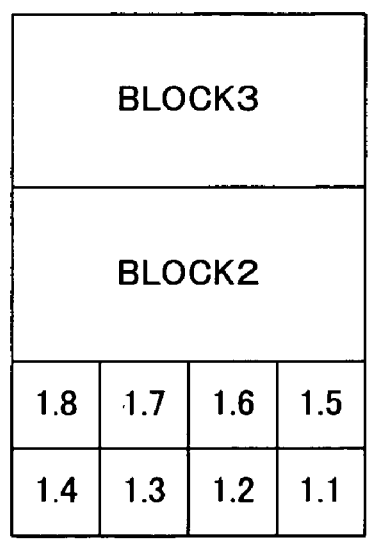

FIGS. 8A to 8C illustrate processing for rotating the image by 180 degrees in a third modification.

In the above-described exemplary embodiment, a block is defined to have a one-pixel dimension in the slow-scanning direction; however, this is not restrictive. A block may be defined to have a two-pixel dimension in the slow-scanning direction, for example, as illustrated in FIG. 8A. In this example, two fast-scan lines are assumed as one block.

Processing to rotate the image by 180 degrees in this case is such that the code editing part 50 simply reorders these blocks in the slow-scanning direction in the same way as explained in the foregoing exemplary embodiment. Then, the pixel editing part 56 buffers the values of pixels in a block into a block line buffer as illustrated in FIG. 8B and reads these values in reverse order to the order in which the values have been buffered. Thereby, the values of the pixels in the block are reordered, as illustrated in FIG. 8C, to rotate the image by 180 degrees.

[Modification 4]

FIGS. 9A and 9B and FIGS. 10A to 10D illustrate shift processing in a fourth modification.

Figure 9A:
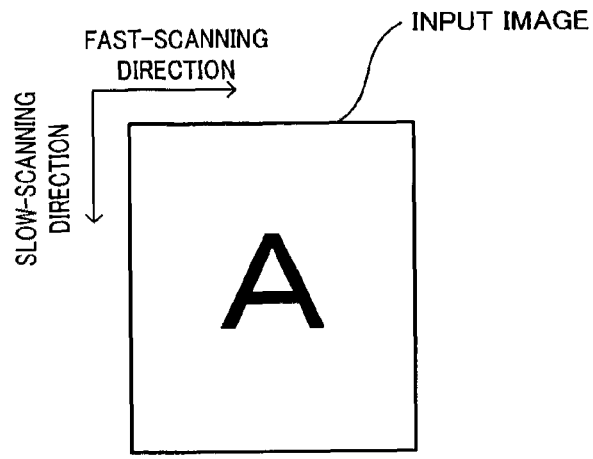
FIGS. 9A and 9B illustrate an outline of shift processing that is performed at an image partition level and at a pixel level.
Figure 9B:
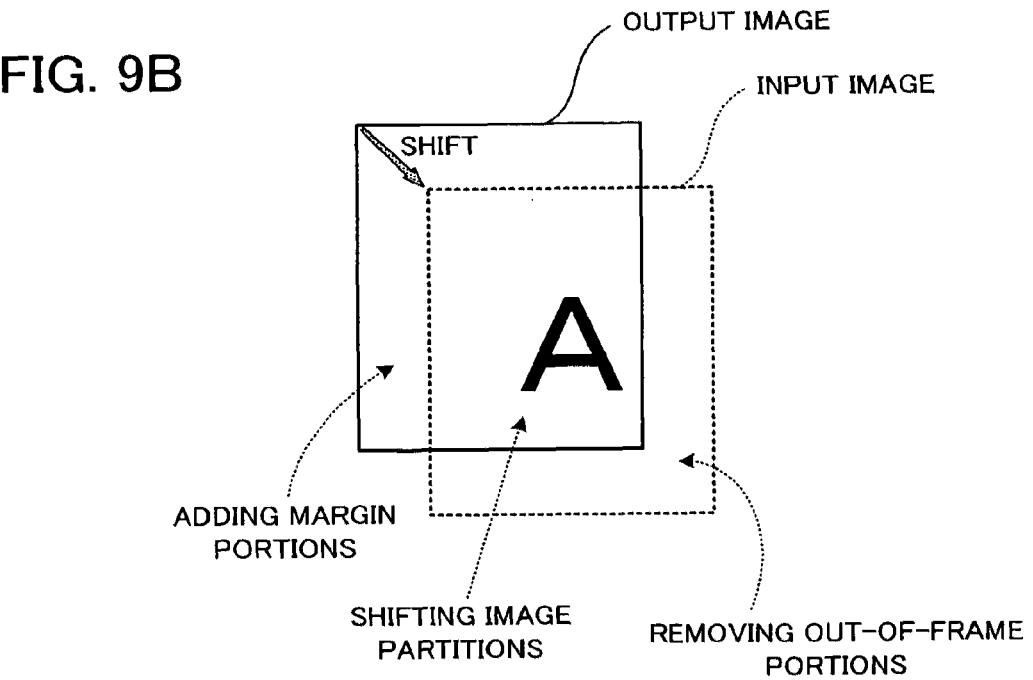

Sometimes, an input image which is illustrated in FIG. 9A may be translated (shifted) and output. This output image is illustrated in FIG. 9B. When such shift processing is performed, it may be needed to add margin portions and remove out-of-frame portions as well as shifting pixels, as illustrated in FIG. 9B.

In the fourth modification, processing that is performed at the block level includes at least one of the following: shifting pixels, adding margin portions, and removing out-of-frame portions. Then, processing such as shifting pixels is performed at the pixel level.

In the following, an instance where an image is shifted by five pixels toward a minus direction in the fast-scanning direction is discussed with reference to FIGS. 10A to 10D.

Figure 10A:
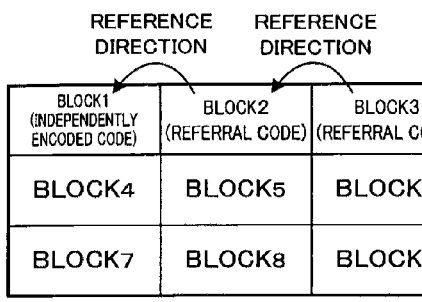
FIGS. 10A to 10D illustrate shift processing in greater detail.
Figure 10B:
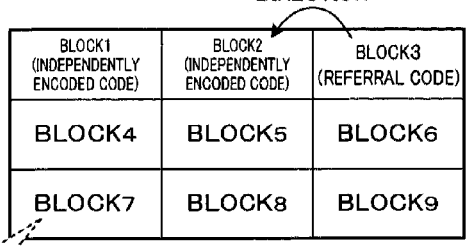

The code editing part 50 determines an image range to be deleted, based on the shift amount and the shift direction for requested shift processing. It then determines whether a block referred to (a block referred to by another block) exists in the determined range that needs to be deleted. If a block referred to exists in the range that needs to be deleted, the code editing part 50 interchanges the code (referral code) of the block that refers to with the code (independently encoded code) of the block referred to, as illustrated in FIGS. 10A and 10B. In this example, as block 2 refers to block 1 that needs to be deleted, the referral code of the block 2 is interchanged with the independently encoded code of the block 1.

Figure 10C:
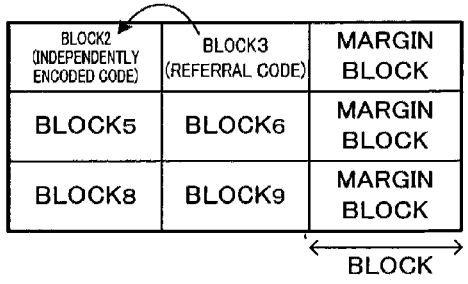

Then, the code editing part 50 performs shift processing at the block level, as illustrated in FIG. 10C. In this example, a shift by five pixels upstream in the fast-scanning direction is requested and, therefore, a one-block shift and a one-pixel shift are performed. For one-block shift processing, the first block (code string) in the fast-scanning direction is deleted and one marginal code string is added in the last position in the fast-scanning direction. Thereby, the code strings of the image partitions 1, 4, and 7 are deleted as out-of-frame portions and one marginal code string is added on each fast-scan line downstream of the remaining code strings (to the right on the drawing).

Next, the decoding part 54 sequentially decodes the code strings which are input in order from the code editing part 50 and outputs a set of decoded values of pixels to the pixel editing part 56. A marginal code is decoded to values of pixels corresponding to a margin.

Then, the pixel editing part 56 performs a pixel-level shift of the values of pixels input from the decoding part 54 by the remaining amount of shift.

Figure 10D:
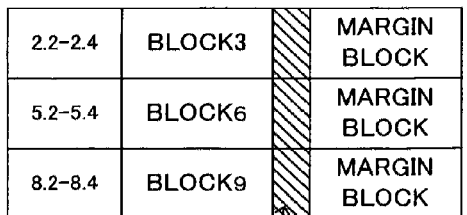

Specifically, for the values of pixels input from the decoding part 54, the pixel editing part 56 cuts the first pixel on each fast-scan line as an out-of-frame pixel and inserts a margin pixel after the last block on each fast-scan line, as illustrated in FIG. 10D.

As explained above, desired shift processing is accomplished by combination of shift processing at the image partition level (processing on codes) and shift processing at the pixel level (processing on pixels).

While processing for a shift in the minus direction has been discussed for illustrative purposes in this example, processing for a shift in a plus direction can be accomplished in the same way, depending on a reference direction by referral code, symmetry, and the like.

The present invention may be embodied in other specific forms without departing from its spirit or characteristics. The described exemplary embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed is:

1. An image processing apparatus comprising:
a processor programmed to perform as:
   a reference-based coding device that is configured to encode image information for an image partition having a predefined size by referring to image information for another image partition;
   an independently coding device that is configured to encode the image information for the image partition independently of any other image partition; and
   a bounds defining device that is configured to define bounds of reference, which are bounds of both indirect references and direct references between the image partition and at least one other image partition, to be made by the reference-based coding device,
   wherein the image partition and the another image partition are portions of a same image.

2. The image processing apparatus according to claim 1, further comprising:
an image information storage area that is large enough to store code entities for image partitions within the bounds of reference defined by the bounds defining device, wherein the processor is further programmed to perform as:
   a code manipulating device that is configured to buffer at least one of code entities generated by the reference-based coding device and code entities generated by the independently coding device into the image information storage area, as appropriate for specifics of a requested image edit, and to perform manipulation on code entities buffered in the image information storage area;
   a code interchanging device that is configured to interchange the code entities buffered in the image information storage area, according to manipulation performed by the code manipulation device; and
   a decoding device that is configured to decode the code entities buffered in the image information storage area.

3. The image processing apparatus according to claim 2, wherein
   the code manipulating device is configured to reorder the code entities buffered in the image information storage area, as appropriate for the specifics of the requested image edit, and
   if a code entity generated by the reference-based coding device is included in code entities that are reordered by the code manipulating device, the code interchanging device is configured to interchange the code entity generated by the reference-based coding device with a code entity for an image partition that is referred to by the code entity generated by the reference-based coding device.

4. The image processing apparatus according to claim 1, wherein the bounds defining device is configured to define the bounds of reference only in a slow-scanning direction.

5. The image processing apparatus according to claim 1, wherein the bounds defining device is configured to define the bounds of reference whose extent in the slow-scanning direction is narrower than the extent in a fast-scanning direction.

6. The image processing apparatus according to claim 1, wherein the reference-based coding device is configured to compare the image information for the image partition, which contains a plurality of pixels, with image information for the other image partition and, if differences therebetween meet a predetermined condition, to encode reference position information to specify the position of the other image partition and difference information to specify the differences.

7. A non-transitory computer-readable medium storing a program causing a computer to execute a process comprising:
   determining whether to permit or inhibit an image partition which is a target of processing to make reference, both direct reference and indirect reference, to at least one other image partition;
   if reference is permitted, encoding image information for the image partition by referring to image information for another image partition; and
   at least if reference is inhibited, encoding the image information for the image partition independently of any other image partition,
   wherein the image partition and the another image partition are portions of a same image.

* * * * *